United States Patent Office 2,773,839
Patented Dec. 11, 1956

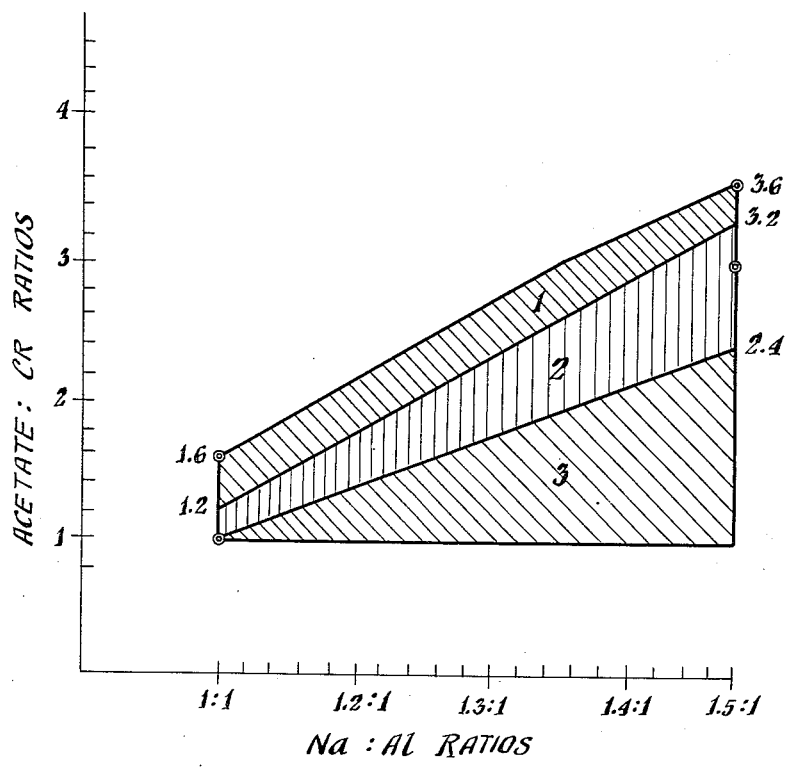

2,773,839

METHOD OF HYDROGEL PREPARATION

William A. Stover and Robert C. Wilson, Jr., Woodbury, N. J., assignors to Socony Mobil Oil Company, Inc., a corporation of New York Application December 14, 1950, Serial No. 201,537

14 Claims. (Cl. 252—448)

This invention relates to an improved process for the formation of true, all-embracing hydrogels having a solids content consisting essentially of one or more hydrous oxides of metals capable of forming water-insoluble hydroxides. More particularly, the present invention is concerned with an improvement in the production of true all-embracing hydrogels of the foregoing composition characterized by a relatively short gelation time and a high hydrous metal oxide product concentration of at least about 10 percent by weight. Product concentration, as utilized herein, refers to the total content of hydrous metal oxide present in the water washed hydrogel multiplied by 100 and divided by the sum of total hydrous metal oxide and water contained in the washed hydrogel.

Hydrosols of hydrous metal oxides have heretofore been prepared by a variety of procedures including metathesis, dialysis, electro-osmosis, peptization, and the like. Among materials suitable for conversion into sols of hydrous oxides are, for example, salts of aluminum, iron, nickel, lead, antimony, cobalt, copper, zinc, cadmium, chromium, molybdenum manganese and the like all of which metals form water-insoluble hydroxides. Such previously prepared hydrosols and the corresponding hydrogels produced therefrom upon gelation have, however, possessed a comparatively low product concentration and consequently have not been suitable in the production of bead-like spheroidal particles produced by methods such as those described in patents to Marisic, for example, U. S. Patent No. 2,384,946.

Previous attempts to increase the product concentration of hydrous metal oxide hydrogels to a level sufficient to insure the production of the aforementioned bead-like spheroidal particles have invariably led to an increase in the content of electrolyte salts present in the desired hydrogel-forming mixture. The presence of such electrolytes in excess quantity has the detrimental effect of coagulating the metal ions in the form of irreversible gelatinous precipitates and not in the form of true hydrogels. The gelatinous precipitates so produced are incapable of being formed into the desired spheroidal particles by the aforementioned procedures of Marisic and further have disadvantages of being structurally weak as compared with true hydrogels and of generally possessing a heterogeneous structure in comparison with the homogeneous structure achieved with true hydrogel formation.

It is accordingly an object of the instant invention to provide a method for preparing true, all-embracing hydrogels of hydrous metal oxides. A further object is the provision of a process for producing a hydrogel having the solid content thereof made up of one or more hydrous metal oxides in the amount of at least about 10 percent by weight and capable of being manufactured into hard, glassy spheroids by the above noted methods of Marisic. A still further object is the production of quick-setting hydrosols of hydrous metal oxides to yield true all-embracing hydrogels of corresponding metal oxide composition.

These and other objects which will be apparent to those skilled in the art are achieved in accordance with the instant invention wherein it has been discovered that hydrous metal oxides may be obtained in the form of true hydrogels characterized by a relatively short gelation time and a product concentration of at least about 10 percent by weight, provided there is present in the hydrosol-forming solution a sufficient quantity of a material which reduces the instantaneous effective concentration of metal ion contained in said solution and is decomposable under conditions which will throw metal oxide out of solution as colloidal particles. Since it has been established that reagents capable of yielding radicals or anions accomplishing this desired result form complexes with the metal ions to be gelled or hydroxides thereof, they will hereinafter be referred to as "complexing agents." Reagents inhibiting the formation of true hydrogels and capable of producing anions which induce the formation of gelatinous precipitates such as sulfate, bisulfate, nitrate, chloride, phosphate, and the like will hereinafter be referred to as "non-complexing agents." It has been found in accordance with the present invention that control of the ratio of the amount of complexing agent to non-complexing agent in the hydrogel-forming mixture is a critical factor in accomplishing the formation of true hydrous metal oxide hydrogels of high product concentration.

The present invention thus contemplates an improved method for preparing hydrogels having a solids content consisting essentially of one or more hydrous metal oxides such as those of aluminum, nickel, iron, cobalt, chromium, lead, antimony, manganese, zinc, cadmium, copper, and other metals capable of forming water-insoluble hydroxides. Such compositions have heretofore been described in the literature and have found application for use as bases for the deposition thereon of various materials possessing catalytic properties. Composites of two or more of the foregoing oxides have further been employed as catalysts for dehydrocyclization, desulfurization, dehydrogenation, cyclization and for reforming of petroleum naphthas to improve their quality as fuels for spark ignition engines. Such catalysts are particularly valuable in the form of hard, glassy spheroids since they are thereby rendered more resistant to abrasion and are hence well adapted to moving bed type systems wherein the catalyst moves in a closed path including a reactor and a regenerator. Such bead-form (spheroidal) gel is advantageously prepared in equipment of the type described in U. S. Patent No. 2,446,783, to Payne. The method described hereinafter in its more preferred aspects accordingly contemplates the use of such apparatus.

In order to produce true, all-embracing hydrogels of the hydrous metal oxides having a high product concentration of at least about 10 percent by weight, it has been discovered that certain critical conditions must be observed. As pointed out hereinabove, it has been found that control of the ratio of complexing agent to non-complexing agent present in the hydrogel-forming mixture is a vital factor in obtaining a hydrosol capable of being manufactured into bead-like hydrogel particles by the procedures of Marisic. If an excess of complexing agent is present, the hydrosol will be slow in setting to a hydrogel. On the other hand, a gelatinous precipitate, which obviously cannot be formed into beads by the aforementioned techniques, will be thrown down if the amount of non-complexing agent in the reaction solution predominates over that of the complexing agent. Furthermore, it has been noted that even smaller quantities of non-complexing agents result in a viscous hydrosol incapable of good bead formation. Minute amounts, for example, small fractions of one percent of non-complexing agents present as impurities, may be tolerated. However, amounts on the order of the quantities present as a result of using salts containing ions such as sulfate, bisulfate, nitrate, chloride, phosphate, and the like in preparation of the solutions must be avoided since they promote rapid precipitation and thus inhibit the formation of true hydrogels. With the use of complexing agents in preparation of the hydrogel-forming solutions and the maintenance therein of a delicate balance between complexing and non-complexing agents, the production of true hydrous metal oxide hydrogels in the form of bead-like spheroids is realized by following the principles of the instant invention.

The complexing agents utilized in the process set forth herein may be either organic or inorganic in nature. The choice of particular complexing agent will depend largely on the composition of the hydrogel which it is desired to produce. Typical of the organic complexing agents are the polyhydric alcohols; for example, glycerol, mannitol, sorbitol, etc. Also hydroxy-carboxylic acids are in general suitable complexing agents, e. g., glycolic, lactic, citric, tartaric acid, etc. Some organic acids will form complexes with specific cations. For example, acetic acid forms a complex with trivalent chromium but not with trivalent aluminum. Oxalic acid, on the other hand, forms a complex with trivalent chromium, trivalent iron, and divalent zinc, but not with trivalent aluminum. Hence, in order to form a catalytic composite consisting essentially of the oxides of iron, chromium, and aluminum, the salts preferably employed would be ferric oxalate, chromic acetate or oxalate, and sodium aluminate. In Table I set forth below are tabulated a number of representative organic complexing agents and the corresponding metal cations with which complexes are formed.

in the hydrogel-forming solutions. It is also within the purview of this invention to employ a combination of organic and inorganic complexing agents to aid hydrogel formation.

It has further been established that the instability constant of the complexes formed is critical. The nature and determination of instability constants are well known to those skilled in analytical chemistry and a discussion of the same will be found in numerous texts; for example, in "Semimicro Qualitative Analysis" by Middleton and Willard, Prentice Hall (1939) wherein a number of instability constants are tabulated on page 151. For purposes of the instant invention, it has been discovered that if the instability constant is too small, the complex is extremely difficult to decompose in the hydrogel state and consequently fails to accomplish its intended purpose. The use of such complexes is accordingly to be avoided if the hydrogel formed is to consist essentially of the desired metal oxide composition. Thus, it has been found that the complex $Fe(CN)_6^{-4}$ with an instability constant $(K_I)$ of $1 \times 10^{-37}$ is difficult to decompose in the hydrogel state and hence ineffective for use in the present process. However, the complex of $Fe(C_2O_4)_3^{-3}$ having an instability constant $(K_I)$ of $1 \times 10^{-10}$ is relatively easy to decompose in the hydrogel state and accordingly represents a suitable complex for purposes of this invention. It has been found that the metal complex utilized in the method described herein as an aid in hydrogel formation should have an instability constant $(K_I)$ of at least $1 \times 10^{-30}$. Generally, the instability constant $(K_I)$ of the complex utilized in the instant process will be between about $1 \times 10^{-10}$ and about $1 \times 10^{-20}$.

Having described in a general way the nature of this

TABLE I

| Cations | Polyhydric Alcohols | | | Hydroxycarboxylic Acids | | | | Specific Compounds | | | |
|---|---|---|---|---|---|---|---|---|---|---|---|
| | Glycerol | Sorbitol | Mannitol | Glycolic | Lactic | Citric | Tartaric | Acid, Acetic | Acid, Oxalic | Sugars | Starches |
| $Al^{+3}$ | + | + | + | + | + | + | + | − | − | + | + |
| $Cr^{+3}$ | + | + | + | + | + | + | + | + | + | + | + |
| $Fe^{+3}$ | + | + | + | + | + | + | + | − | + | + | + |
| $Cu^{+2}$ | + | + | + | + | + | + | + | − | − | + | + |
| $Mo^{+6}$ | + | + | + | − | − | + | + | − | − | + | + |

(+) Complexes are formed with cation or with hydroxide of cation.
(−) No complexes are formed.

The foregoing table is not considered to be exhaustive but rather merely illustrative of typical organic complexing agents which may be present in the solutions employed in instant hydrogel formation.

Inorganic complexing agents are generally more specific in their action than the aforementioned organic complexing agents. Representative inorganic complexing agents and the corresponding metal cations with which complexes are formed are given in Table II below:

TABLE II

| Cations | Complexing Agents | | | |
|---|---|---|---|---|
| | $NH_4^+$ | $CN^-$ | $CNS^-$ | $OH^{-*}$ |
| $Al^{+3}$ | − | − | − | + |
| $Cr^{+3}$ | slight | − | − | − |
| $Fe^{+3}$ | − | + | + | − |
| $Cu^{+2}$ | + | + | − | − |
| $Zn^{+2}$ | + | + | − | + |
| $Ni^{+2}$ | + | + | − | − |
| $Co^{+2}$ | + | − | + | − |
| $Cd^{+2}$ | + | + | − | − |
| $Mo^{+6}$ | − | + | − | + |

(+) Complexes are formed with cations.
(−) Complexes are not formed with cations.
*Hydroxyl ion forms complexes with hydroxide of cations.

The contents of this table likewise are not to be construed as limiting since other inorganic complexing agents familiar to those skilled in the art may likewise be present invention, the instantly contemplated method of true hydrogel formation may be more readily understood by reference to the following illustrative examples:

*Example 1*

A chromia-alumina hydrogel was prepared from the following reactants:

SOLUTION A 250 cc. of sodium aluminate solution containing 3.1 moles $Al_2O_3$ per liter,
250 cc. distilled water;

SOLUTION B 250 cc. chromic acetate solution containing 1.2 moles $Cr_2O_3$ per liter,
250 cc. distilled water.

Solution B was added rapidly to Solution A at a temperature of 70° F. wtih agitation. The hydrosol so formed was poured into trays and set to a hydrogel in 20 seconds. The resulting hydrogel having a pH of 10.1 was cut into cubes and treated with 10 percent by weight aqueous ammonium sulfate solution. The cubes were then washed with distilled water until a sulfate-free wash water was indicated. The product concentration of the resulting hydrogel was 11 percent by weight. The cubes were dried in 100 percent steam at 260–270° F. for 3 hours and then calcined 4 hours at 1100° F. in air. The resulting gel composite contained 33 mole percent of $Cr_2O_3$ and 67 mole percent of $Al_2O_3$. The gel also contained .014 weight percent sodium and 5.3 weight percent sulfate as undesirable impurities. The gel had a surface area of 210 square meters per gram and proved to be an effective catalyst for reforming petroleum naphthas.

*Example 2*

A chromina-alumina hydrogel was prepared from the following reactants:

SOLUTION A 390 cc. of sodium aluminate solution contianing 2.0 moles $Al_2O_3$ per liter;

SOLUTION B 260 cc. of chromic acetate solution containing 1.0 mole $Cr_2O_3$ per liter.

Gelation was carried out employing the procedure of Example 1. However, because the hydrogel was formed at a pH of 9.1, the hydrogel cubes were treated with 1 percent by weight of aqueous ammonium sulfate solution. The cubes were washed with distilled water until a sulfate-free wash water was indicated. The resulting hydrogel had a product concentration of 16 percent by weight. The hydrogel was dried and tempered in the same manner as in Example 1. The resulting gel composite contained 44 mole percent $Cr_2O_3$ and 56 mole percent $Al_2O_3$. The finished gel contained 0.02 weight percent sodium and 5.8 weight percent sulfate as undesirable impurities. The gel had a surface area of 215 square meters per gram and proved to be an effective reforming catalyst.

*Example 3*

A chromia-alumina hydrogel was prepared from the following reactants:

SOLUTION A 60 cc. of sodium hydroxide solution containing 100 grams NaOH per 320 cc. solution,
340 cc. sodium aluminate solution containing 3.5 moles $Al_2O_3$ per liter,
350 cc. distilled water;

SOLUTION B 850 cc. chromic acetate solution containing 1.0 mole $Cr_2O_3$ per liter.

Gelation was carried out employing the procedure of Example 1. A hydrogel having a gelation time of 20 seconds and a pH of 8.6 was obtained. The resulting hydrogel was cut into cubes and treated 20 times at 1-hour intervals with a 1 percent by weight aqueous solution of ammonium sulfate. The cubes were washed with distilled water which was changed at 1-hour intervals until a sulfate-free wash water was indicated. The product concentration of the hydrogel was about 9 percent by weight. The washed hydrogel was dried as in Example 1. The resulting gel was pelleted, giving a composite having a surface area of 146 square meters per gram. The resulting gel contained 57 mol percent $Cr_2O_3$ and 43 mole percent $Al_2O_3$. The gel also contained 0.06 weight percent sodium and 6.4 weight percent sulfate as undesirable impurities.

*Example 4*

A chromia-alumina hydrogel was prepared from the following reactants:

SOLUTION A 72 cc. of sodium aluminate solution containing 3.5 moles $Al_2O_3$ per liter,
37 cc. of sodium hydroxide solution containing 454 grams of NaOH per liter;

SOLUTION B 464 cc. chromic acetate solution containing 0.78 mole $Cr_2O_3$ per liter.

Gelation was carried out following the procedure of Example 1. A hydrogel having a gelation time of 30 seconds and a pH of 9.8 was obtained. The resulting hydrogel was cut into cubes and treated 40 times with 1 weight percent aqueous solution of ammonium sulfate at 1-hour intervals. The cubes were washed with distilled water at 1-hour intervals until a sulfate-free wash water was indicated. The resulting hydrogel had a product concentration of 12 percent by weight. The washed hydrogel was dried and tempered as in Example 1. The resulting gel contained 62 mole percent $Cr_2O_3$ and 38 mole percent $Al_2O_3$. The gel also contained 0.01 weight percent sodium and 5.3 weight percent sulfate as undesirable impurities. The gel had a surface area of 167 square meters per gram and proved to be an effective catalyst in the reforming of petroleum naphthas.

*Example 5*

Chromia-alumina hydrogels were prepared from the following reactants:

SOLUTION A 67 cc. of sodium aluminate solution having a sodium to aluminum mole ratio of 1.25 and containing 2.66 moles $Al_2O_3$ per liter,
33 cc. of distilled water;

SOLUTION B 100 cc. of chromic acetate solution having an acetate to chromium mole ratio of 2.91 and containing 0.80 mole $Cr_2O_3$ per liter,
50 cc. of distilled water.

Solution B was added rapidly to Solution A with agitation at varying temperatures. In Case I both solutions were at a temperature of 74° F. and the hydrosol set to a firm, all-embracing hydrogel in 90 seconds. In Case II both solutions were chilled to a temperature of 35° F. and the hydrosol was maintained at a temperature of 35–40° F. until it set to a moderately firm, all-embracing hydrogel in 60 minutes. In Case III both solutions were chilled to a temperature of 37° F. and the temperature of the hydrosol was allowed to rise gradually until it set to a moderately firm, all-embracing hydrogel in 15 minutes at a temperature of 62° F. The product concentration of the hydrogels so obtained after water washing free of water-soluble impurities was 11 percent by weight.

*Example 6*

A chromia hydrogel was prepared from the following reactants:

SOLUTION A 120 cc. sodium hydroxide solution containing 300 grams of NaOH per 600 cc. of solution;

SOLUTION B 720 cc. of chromic acetate solution containing 0.78 mole $Cr_2O_3$ per liter.

Solution B was added rapidly to Solution A at a temperature of 70° F. with agitation. The hydrosol so formed was poured into trays and set to a hydrogel in 20 seconds. The resulting hydrogel, having a pH of 9.6, was cut into cubes, treated with 10 percent by weight aqueous ammonium sulfate solution and water washed, yielding a hydrogel having a product concentration of approximately 10 percent by weight. The hydrogel was thereafter treated as in Example 1 to give a gel consisting essentially of chromia.

*Example 7*

An alumina hydrogel was prepared from the following reactants:

SOLUTION A 500 cc. sodium aluminate solution containing 3.5 moles $Al_2O_3$ per liter;

SOLUTION B 100 cc. citric acid solution containing 100 grams of citric acid per 100 cc. of solution,
100 cc. tartaric acid solution containing 100 grams of tartaric acid per 100 cc. of solution,
300 cc. of distilled water.

Solution B was added to Solution A at room temperature with stirring. The resulting aluminum hydroxide hydrosol set to a hydrogel in 20 seconds at a pH of 11.0. The hydrogel was cut into cubes and the pH thereof lowered to 8.5 by circulating 20 percent by weight aqueous solution of ammonium sulfate. The pH of the solution was maintained at 8.5 by the addition of sulfuric acid. After the pH of the hydrogel was lowered to 8.5, as indicated by no further consumption of acid, the hydrogel was washed with distilled water until a sulfate-free wash water was indicated. The hydrogel so obtained had a product concentration of 15 percent by weight. The resulting hydrogel was then dried in 100 percent steam at 260–270° F. for 3 hours and then tempered 6 hours at 1200° F. in an atmosphere of air. The finished alumina gel was hard and glassy in appearance.

*Example 8*

A chromia-alumina hydrogel was prepared from the following reactants:

SOLUTION A 80 cc. of sodium aluminate solution containing 2.1 moles $Al_2O_3$ per liter;

SOLUTION B 50 cc. of chromic acetate solution containing 1 mole $Cr_2O_3$ per liter and 10 grams of tartaric acid.

Solution B was added rapidly to Solution A at room temperature with stirring. A chromia-alumina hydrogel having a pH of 9.1 was formed in 40 seconds which, after water-washing free of water-soluble impurities, had a product concentration of 16 percent by weight.

*Example 9*

A chromia-alumina hydrogel was prepared from the following reactants:

SOLUTION A 80 cc. of sodium aluminate solution containing 2.1 moles $Al_2O_3$ per liter;

SOLUTION B 50 cc. chromic acetate solution containing 1 mole $Cr_2O_3$ per liter and 10 grams of citric acid.

Solution B was added rapidly to Solution A at room temperature with agitation. The hydrosol so formed set to a hydrogel at a pH of 9.4 in 40 seconds. After water-washing free of water-soluble impurities, the hydrogel had a product concentration of 16 percent by weight.

*Example 10*

A chromia-alumina hydrogel was prepared from the following reactants:

SOLUTION A 60 cc. sodium aluminate solution containing 2.3 moles $Al_2O_3$ per liter;

SOLUTION B 50 cc. of chromic acetate solution containing 1 mole $Cr_2O_3$ per liter;
10 cc. of glycolic acid (70% wt.)

Solution B was added rapidly to Solution A at room temperature with stirring to yield a hydrosol which set to a hydrogel at a pH of 9.7 in 20 seconds. After water-washing free of water-soluble impurities, the hydrogel had a product concentration of 16 percent by weight.

*Example 11*

A chromia-alumina hydrogel was prepared from the following reactants:

SOLUTION A 500 cc. of sodium aluminate solution containing 3.5 moles $Al_2O_3$ per liter;
40 grams of sorbitol.

SOLUTION B 500 cc. of chromic acetate solution containing 1 mole $Cr_2O_3$ per liter.

Solution B was added rapidly to Solution A at room temperature with agitation. The resulting hydrosol was poured into a column of hot D. T. E. heavy oil. The oil was heated to 140–160° F. The hydrosol set to spheroidal hydrogel particles. Twenty percent by weight aqueous ammonium nitrate solution was circulated over the hydrogel until the pH of the hydrogel was reduced to 8.5. Nitric acid was added to the ammonium nitrate solution to maintain the pH at 8.5. The hydrogel beads were washed with distilled water until a nitrate-free wash water was indicated. The hydrogel so obtained had a product concentration of 22 percent by weight. The washed hydrogel was then dried at 260–270° F. in 100 percent steam for 3 hours and then tempered 4 hours at 1100° F. in an atmosphere of hydrogen.

*Example 12*

A chromia-alumina hydrogel was prepared from the following reactants:

SOLUTION A 50 cc. of sodium aluminate solution containing 2.0 moles $Al_2O_3$ per liter;
5 cc. glycerol.

SOLUTION B 50 cc. chromic acetate solution containing 1 mole $Cr_2O_3$ per liter.

Solution A was mixed rapidly with Solution B at room temperature with stirring. The resulting hydrosol set in 40 seconds to a black, brittle hydrogel having a pH of 11.0. After washing with water to remove water-soluble impurities, the hydrogel had a product concentration of 15 percent by weight.

*Example 13*

A chromia-copper oxide hydrogel was prepared from the following reactants:

SOLUTION A 50 cc. $Cu(NH_3)_4(OAC)_2$ solution containing 454 grams copper acetate made up to a final volume of 1100 cc. with water and concentrated ammonium hydroxide. pH of solution was 8.8.

SOLUTION B 40 cc. of chromic sulfate solution containing 1 mole $Cr_2O_3$ per liter.

Solution B was added to Solution A and mixed rapidly at room temperature. The resulting hydrosol set to a chromia-copper oxide hydrogel having a pH of 6.6 in 40 seconds. After water-washing free of water-soluble impurities, the hydrogel had a product concentration of 14 percent by weight.

*Example 14*

A chromia-alumina-ferric oxide hydrogel was prepared from the following reactants:

SOLUTION A 170 cc. sodium aluminate solution containing 3.5 moles $Al_2O_3$ per liter;

SOLUTION B 300 cc. chromic acetate solution containing 1.2 moles $Cr_2O_3$ per liter,
200 cc. of ferric acetate solution containing 1.2 moles $Fe_2O_3$ per liter.

Solution B was added to Solution A and mixed rapidly at room temperature. The resulting hydrosol was poured into trays and set to a hydrogel in 30 seconds at a pH of 9.5. The hydrogel so obtained was cut into cubes and treated with a 20 percent by weight aqueous solution of ammonium sulfate until the pH of the hydrogel was reduced to 8.5. The hydrogel was then washed with distilled water until the washed water was free of sulfates. The washed hydrogel had a product concentration of 20 percent by weight. The resulting hydrogel was dried in 100 percent steam at 260-270° F. and tempered 4 hours at 1100° F. in an atmosphere of air. The resulting gel composite was ground to 40 mesh screen size and pelleted. The composition of the finished pelleted catalyst was 20 mole percent $Fe_2O_3$, 30 mole percent $Cr_2O_3$ and 50 mole percent $Al_2O_3$. The pelleted catalyst had a surface area of 171 square meters per gram.

*Example 15*

A chromia-alumina hydrogel was prepared from the following reactants:

SOLUTION A 47.5 pounds sodium aluminate made up to a volume of 10 gallons with distilled water;

SOLUTION B 48 pounds chromic acetate, the acetate to chromium ratio of which is adjusted within the approximate range of 2.6 to 2.8 and then made up to a volume of 13 gallons with distilled water, providing a solution containing 0.92 mole $Cr_2O_3$ per liter.

Solutions A and B were pumped separately under pressure through heating coils to an efficient mixing nozzle. The solutions were heated to about 110° F. and mixed in equal volumes at a total rate of 1200 cc. per minute. The resulting stream of hydrosol flowed over a divider into a column of D. T. E. light oil. The hydrosol set to beads of hydrogel and the resulting hydrogel beads were sluiced from the bottom of the forming tower with a 20 percent by weight aqueous solution of ammonium sulfate. The sluicing solution was maintained at a pH of 8.5 by the addition of sulfuric acid. Since the pH of the hydrogel was about 10.5, it was necessary to add sulfuric acid to the sluicing solution in order to maintain the pH at 8.5. The bead hydrogel was aged for 24 hours in the same solution that was used to sluice from the forming tower. After aging, the gel was washed until a sulfate-free wash water was indicated. The washed hydrogel had a product concentration of 21 percent by weight. The hydrogel was thereafter dried in 100 percent steam at 260-270° F. for 3 to 4 hours and then tempered 4 hours, at 1100° F. in a hydrogen atmosphere. The resulting beads of gel contained 21 mole percent $Cr_2O_3$ and 79 mole percent $Al_2O_3$. The finished gel also contained 0.01 weight percent sodium and 0.6 weight percent sulfate as undesirable impurities. The gel had a surface area of 231 square meters per gram and proved to be an effective catalyst for reforming, hydroforming and desulfurization of petroleum fractions.

*Example 16*

A chromia-alumina hydrogel was prepared as in the preceding example except that ammonium nitrate was substituted for ammonium sulfate as the base exchange solution. A portion of washed hydrogel was impregnated with 13 liters of an aqueous solution montaining 775 grams of copper acetate and 223 grams of potassium acetate. The impregnated hydrogel was dried in 100 percent steam at 260-270° F. and tempered 4 hours at 1100° F. in a hydrogen atmosphere. The gel before impregnation contained 26 mole percent $Cr_2O_3$ and 74 mole percent $Al_2O_3$. After impregnation, the gel contained 20 mole percent $Cr_2O_3$, 17 mole percent CuO, 2 mole percent $K_2O$ and 61 mole percent $Al_2O_3$. The gel before impregnation contained 0.06 weight percent sodium and 0.11 weight percent sulfate as undesirable impurities. After impregnation, the gel contained 0.31 weight percent sodium and 0.04 weight percent sulfate. The gel before impregnation had a surface area of 193 square meters per gram. After impregnation, the catalyst had a surface area of 222 square meters per gram.

*Example 17*

A $Cr_2O_3$-$Al_2O_3$-$Sb_2O_3$ hydrogel was prepared from the following reactants:

SOLUTION A 130 pounds aluminum trihydrate, 6.5 pounds antimony trioxide, and 195 pounds of 48.9° Bé. caustic solution were reacted and then made up to a volume of 38.6 gallons with distilled water; solution contained 2.58 moles $Al_2O_3$ and 0.07 mole $Sb_2O_3$ per liter;

SOLUTION B 39.8 gallons chromic acetate solution, having an acetate to chromium mole ratio of 2.91 and containing 0.74 mole $Cr_2O_3$ per liter.

Solution A was pumped at a rate of about 680 cc. per minute to an efficient mixing nozzle. Solution B was preheated to about 145° F. and pumped to the nozzle at a rate of about 700 cc. per minute. The resulting stream of hydrosol flowed over a divider into a column of a blend of halogenated hydrocarbons and petroleum fractions. The hydrosol set to beads of hydrogel in about 6 seconds and the resulting hydrogel beads were sluiced from the bottom of the forming tower with the oil blend. The hydrogel beads were then separated from the oil blend and aged for 24 hours in a 20 percent by weight aqueous solution of ammonium sulfate. After aging, the gel was water-washed until a sulfate-free wash water was indicated. The washed hydrogel had a product concentration of 17 percent by weight. The hydrogel was thereafter dried in 100 percent steam at about 230° F. for 7 hours and then tempered for 3 hours at 1000° F. The resulting beads of gel contained 24.8 mole percent $Cr_2O_3$, 73.6 mole percent $Al_2O_3$, and 1.6 mole percent $Sb_2O_3$. The finished gel also contained 0.36 weight percent sodium as undesirable impurity. The gel had a surface area of 260 square meters per gram and proved to be an effective catalyst for reforming, hydroforming, and desulfurization of petroleum fractions.

It is believed evident from the foregoing examples that hydrous metal oxide hydrogels having a short time of set and a high product concentration may readily be prepared by controlling the ratio of complexing agent to non-complexing agent in the hydrogel-forming mixture as discussed hereinabove. Generally, hydrogels prepared by the process described herein are characterized by a gelation time of not more than 2 hours and a solids content of between about 10 and about 30 percent by weight. The method of this invention is particularly valuable in the production of hydrogels characterized by a time of set of less than 60 seconds.

The particular ratio of complexing agent to non-complexing agent to be employed will depend upon the composition of the hydrous metal oxide hydrogel desired. This ratio may be readily ascertained by those skilled in the art following the principles of this invention. Typical hydrous metal oxide hydrogels suitably prepared by the procedure desribed herein are chromia hydrogel, alumina hydrogel, and composites thereof. Chrome-alumina hydrogels are readily produced under the controlled conditions discussed hereinabove by mixing aqueous solutions of an organic chromium salt, such as chromium acetate and alkali metal aluminate. Following the procedure of this invention, the reactant solutions should be substantially free of non-complexing ions, such as sulfate, bisulfate, nitrate, chloride, and phosphate. It is accordingly preferred that the reactant solutions be prepared from raw materials substantially free of such contaminants.

By way of illustration, it may be pointed out that chromium acetate may be prepared by reduction of sodium bichromate with $SO_2$ precipitation of the carbonate and decomposition of the washed precipitate with acetic acid. This requires extensive washing of chromium carbonate in order to extract sulfates. The preferred method of preparation uses the more expensive glycolic acid, but it has been found to be more economical in that undesirable ions are not introduced. Similarly, it has been found best to prepare the alkali metal aluminate, for example, sodium aluminate, by the action of caustic soda on aluminum trihydrate in preference to aluminum sulfate.

The factors of temperature, acidity, and product concentration are interrelated variables effecting gelation and within the limits in which formation of hydrogels occurs, they control gelation time. In general, the other factors can be controlled to achieve gelation at any practicable solution temperature. Thus, temperatures from 30° F. to 130° F. have been used. Best gelation times for the chrome-alumina hydrogels referred to above have been experienced at temperatures between about 120 and about 140° F. The product concentration expressed as weight percent of water-insoluble inorganic oxides in the hydrogel may vary from about 10 to about 30; preferably, for chrome-alumina hydrogel, this value is about 18 percent. It is to be noted that the water-insoluble inorganic oxides are formed first as a hydrosol, which thereafter sets to the rigid hydrogel. It has been found that under certain conditions, a portion of the aluminum can be washed out of the freshly formed hydrogel. It is not known whether the aluminum is present as sodium aluminate or alumina, capable of being dissolved by the alkaline liquid phase of the gel. Reference herein to content of water-insoluble inorganic oxides contemplates inclusion of such removable aluminum oxide in the total. For example, the content of aluminum and chromium oxide may be determined by calculating the oxide equivalent of the reactant salts used in preparation of the hydrosol. The pH of the hydrogel may vary over a wide range, depending on the particular composition thereof. Thus, the pH may range from about 11.6 for a pure alumina hydrogel to about 5.5 for a pure chromia gel. Satisfactory chrome-alumina hydrogels may be formed at pH values between about 9 and about 13. For bead formation, a pH value of about 12 has been found to yield excellent results.

Alumina hydrogels, chromia hydrogels, and chromia-alumina hydrogels, as well as other hydrous inorganic metal oxide hydrogels, have been prepared by the method of this invention. As pointed out above, for preparation of a chromia-alumina hydrogel, it is preferred to use aqueous solutions of sodium aluminate and chromium acetate. Neither of these substances is a true chemical compound. The ratio of sodium to aluminum can be varied widely as can the ratio of chromium to acetate ion. It has been found that variation in the sodium to aluminum ratio of the aluminate solution requires compensating adjustment of the chromium to acetate ratio of the second solution in order to achieve satisfactory gelation. The bead process requires short gelation times of the order of 5 to 10 seconds and generally not more than 20 seconds for proper operation. The drawing annexed hereto presents data graphically illustrating relationships between chromium to acetate ratios and sodium to aluminum ratios which yield hydrosols satisfactory for bead formation.

Referring more particularly to the graph, the area designated as 1 includes relationships involving quick setting hydrosols of low viscosity which can be readily handled at bead-forming nozzles. The area designated as 2 includes relationships yielding slow setting hydrosols. These hydrosols may be handled in bead-forming equipment by application of heat to increase the velocity of the gelation process. The area designated as 3 includes hydrosols of very long gelation time. Some of the hydrosols included in this area have gelation times of from 12 to 24 hours and consequently are unsatisfactory for bead formation.

The relationships shown graphically in the drawing are readily reduced to mathematical expressions. All of the sodium aluminate solutions have a sodium to aluminum mole ratio, designated hereinafter as "R," between 1 and 1.5. The preferred area 1 is further defined in stating that the acetate to chromium mole ratio is not less than $4R-2.8$ and not more than $4R-2.4$. The operative range of values including areas 1 and 2 involve the same maximum of $4R-2.4$ but the minimum is $2.8R-1.8$.

The control of the mole ratios discussed above is readily achieved in the manufacture of the reactant solutions. As pointed out, chromium acetate is readily formed without introduction of undesirable extraneous materials by reducing sodium dichromate with glycolic acid in the presence of acetic acid. Sodium dichromate, water and acetic acid are mixed and heated at atmospheric pressure. After heating to 170–220° F., the glycolic acid is gradually added. Thereafter, the mixture is digested at 210–220° F. until evolution of carbon dioxide therefrom has ceased. The proportions of reactants used may be varied within wide limits to form the chromium acetate complex at desired mole ratios.

Sodium aluminate of satisfactory quality has been prepared from caustic soda of 50° Bé. and aluminum trihydrate. At a sodium to aluminum mole ratio in the range of 1.25/1 to 1.5/1, the sodium aluminate is advantageously manufactured in an open agitated kettle at 220–230° F. with a reaction time of 1 to 3 hours. Solutions having a lower mole ratio down to about 1.0/1 are made in an autoclave at 240 to 300° F. and 10 to 30 pounds per square inch gauge at the same reaction time. Sodium aluminate solutions having a low sodium to aluminum ratio less than 1.3 are relatively unstable and may be stabilized by the addition of such organic materials as glycerin, starch, sugar, and the like.

For the production of chromia-alumina hydrogel beads, preparation is carried out substantially the same as that described in the above noted Marisic patent for producing silica-alumina beads. Thus, a chromium acetate solution and a sodium aluminate solution are contacted in a mixing nozzle and discharged onto the apex of a dividing cone from which a number of small streams flow into a column of water-immiscible liquid. In the present case, the hydrosol is mixed at a temperature of 120 to 140° F. and the water immiscible liquid into which the hydrosol passes is maintained at about the same temperature by circulation through a heat exchanger outside the tower. A suitable water-immiscible liquid for the present purpose is a blend of kerosene, lubricating oil stock, and a halogenated hydrocarbon, the resultant mixture having a Saybolt-Universal viscosity of about 75 seconds at 130° F. and a specific gravity of about 1.25 at 130° F.

The chromia-alumina hydrogel beads when formed in the manner generally discussed above are subject to a loss of aluminum as sodium aluminate if immediately washed with water. This tends to weaken the hydrogel to such an extent that it disintegrates in the wash water. That adverse effect can be avoided by immediately treating the freshly formed hydrogel in a slightly alkaline aqueous medium. In a typical operation, the fresh hydrogel beads are sluiced out of the forming tower by the oil blend described above. The hydrogel beads are then separated from the oil and treated with a 20 percent by weight solution of ammonium sulfate. The solution is advantageously kept at a pH of 8.0 to 9.5 by the addition of sulfuric acid. It has been found advisable to maintain a solution of this type in contact with the freshly formed hydrogel for some time after formation. For example, the solution is recirculated through the fresh bead gel for 2 to 24 hours after forming in order to fix the alumina.

Chromia-alumina hydrogel is relatively difficult to wash and hydrogel beads of such composition normally require from 16 to 68 hours of water-washing. This is apparently due to the relatively high product concentration of these hydrogels. However, excessive water-washing must be avoided because of the tendency to peptization of some of the oxides resulting in at least partial disintegration of the hydrogel. This effect has been noted when the hydrogel is washed for more than 24 hours after the effluent wash water tests sulfate-free.

The washed hydrogel can be satisfactorily dried in either superheated steam or heated air. The hydrogel beads so dried have been tempered for 4 hours at 1100° F. in atmospheres of hydrogen, nitrogen, carbon monoxide, carbon dioxide, steam, and air. The use of mixtures containing oxygen results in production of gel beads having low mechanical strength. Of the media tested, a mixture containing oxygen is the only agent which reduces catalytic activity of the gel beads as measured by their capacity for dehydrogenation of naphthenes. The chromia-alumina gel beads should accordingly be tempered in an inert or reducing atmosphere such as flue gas.

While the foregoing detailed description and discussion has been directed primarily to alumina hydrogels, chromia hydrogels and particularly to chromia-alumina hydrogels, it is within the purview of this invention to similarly prepare other hydrous metal oxide hydrogels of high product concentration and short gelation time by following the principles set forth herein. The present invention thus contemplates the formation of hydrogels consisting essentially of one or more of the oxides of aluminum, iron, lead, antimony, nickel, cobalt, copper, zinc, cadmium, chromium, molybdenum, and manganese, all of which metals form water-insoluble hydroxides.

It is to be understood that the above description is merely illustrative of preferred embodiments of the invention, of which many variations may be made within the scope of the following claims by those skilled in the art without departing from the spirit thereof.

We claim:

1. A process for producing an all-embracing hydrogel having as its major solid components the oxides of aluminum and chromium present in an amount of at least about 10 percent by weight, which comprises intimately mixing in concentration sufficient to insure said amount an aqueous solution of an alkali metal aluminate having an alkali metal to aluminum ratio designated as R of not less than about 1 and not more than about 1.5 and an aqueous solution of a chromium salt, the anion of which forms a complex with chromium, having a ratio of said anion to chromium of at least about 1 and not more than about 4R-2.4 to yield a hydrosol characterized by an inherent capacity to set to a hydrogel upon lapse of a suitable period of time.

2. A process for producing an all-embracing hydrogel having as its major solid components the oxides of aluminum and chromium present in an amount of at least about 10 percent by weight, which comprises intimately mixing in concentration sufficient to insure said amount an aqueous solution of sodium aluminate having a sodium to aluminate ratio designated as R of not less than about 1 and not more than about 1.5 and an aqueous solution of chromic acetate having an acetate to chromium ratio of at least about 1 and not more than about 4R-2.4 to yield a hydrosol characterized by an inherent capacity to set to a hydrosol upon lapse of a suitable period of time.

3. A process for producing an all-embracing hydrogel having as its major solid components the oxides of aluminum and chromium present in an amount of at least about 10 percent by weight, which comprises intimately mixing in concentration sufficient to insure said amount an aqueous solution of an alkali metal aluminate having an alkali metal to aluminum ratio designated as R of not less than about 1 and not more than about 1.5 and an aqueous solution of chromic acetate having an acetate to chromium ratio of not less than about 2.8R-1.8 and not more than about 4R-2.4 to yield a hydrosol characterized by an inherent capacity to set to a hydrogel.

4. A process for preparing a chromia-alumina hydrogel having a metal oxide content of at least about 10 percent by weight, which comprises intimately mixing in concentration sufficient to insure said metal oxide content an aqueous solution of sodium aluminate having a sodium to aluminum ratio designated as R of not less than about 1 and not more than about 1.5 and an aqueous solution of chromic acetate having an acetate to chromium ratio of not less than about 2.8R-1.8 and not more than about 4R-2.4 to yield a hydrosol characterized by an inherent capacity to set to a hydrogel in less than about two hours.

5. A process for preparing a chromia-alumina hydrogel having a metal oxide content of at least about 10 percent by weight, which comprises intimately mixing in concentration sufficient to insure said metal oxide content an aqueous solution of sodium aluminate having a sodium to aluminum ratio designated as R of not less than about 1 and not more than about 1.5 and an aqueous solution of chromic acetate having an acetate to chromium ratio of not less than about 4R-2.8 and not more than about 4R-2.4 to yield a hydrosol characterized by an inherent capacity to set to a hydrogel in less than about 60 seconds.

6. A process for preparing a chromia-alumina gel, which comprises mixing an aqueous solution of sodium aluminate having a sodium to aluminum ratio designated as R of not less than about 1 and not more than about 1.5 and an aqueous solution of chromic acetate having an acetate to chromium ratio of at least about 1 and not more than about 4R-2.4 to yield a hydrosol having a chromia-alumina content of at least about 10 percent by weight and characterized by an inherent capacity to set to a hydrogel upon lapse of a suitable period of time, permitting said hydrosol to set to a hydrogel, washing the resulting hydrogel free of water-soluble matter and drying the washed hydrogel.

7. A process for the production of chromia-alumina spheroidal gel particles, which comprises mixing an aqueous solution of sodium aluminate having a sodium to aluminum ratio designated as R of not less than about 1 and not more than about 1.5 and an aqueous solution of chromic acetate having an acetate to chromium ratio of not less than about 2.8R-1.8 and not more than about 4R-2.4 to yield a hydrosol having a chromia-alumina content of at least about 10 percent by weight and characterized by an inherent capacity to set to a hydrogel upon lapse of a suitable period of time, admitting said sol in the form of separate globules to a body of a fluid medium substantially immiscible with water wherein the globules assume a spheroidal shape and set to hydrogel, washing the resulting spheroidal hydrogel, drying and calcining the same to yield hard particles of chromia-alumina gel.

8. A process for the production of chromia-alumina spheroidal gel particles, which comprises mixing an aqueous solution of sodium aluminate having a sodium to aluminum ratio designated as R of not less than about 1 and not more than about 1.5 and an aqueous solution of chromic acetate having an acetate to chromium ratio of not less than about 4R-2.8 and not more than about 4R-2.4 to yield a hydrosol having a chromia-alumina content of at least about 10 percent by weight and characterized by an inherent capacity to set to a hydrogel upon lapse of a suitable period of time, admitting said sol in the form of separate globules to a body of a fluid medium substantially immiscible with water wherein the globules assume a spheroidal shape and set to hydrogel, washing the resulting spheroidal hydrogel, drying and calcining the same to yield hard particles of chromia-alumina gel.

9. The process of claim 2 in which at least one of the aqueous reactant solutions contains a polyhydric alcohol.

10. The process of claim 2 in which at least one of the aqueous reactant solutions contains a hydroxycarboxylic acid.

11. A process for preparing an all-embracing hydrogel consisting essentially of a major proportion of aluminum oxide and a minor proportion of chromium oxide and in which the content of said oxides is between about 10 and about 30 percent by weight, which comprises mixing in concentration sufficient to insure said metal oxide content an aqueous solution of sodium aluminate having a sodium to aluminum ratio designated as R of not less than about 1 and not more than about 1.5 and an aqueous solution of chromic acetate having an acetate to chromium ratio of not less than about 2.8R–1.8 and not more than about 4R–2.4 to yield a hydrosol having a pH within the approximate range of 9 to 13 and characterized by an inherent capacity to set to a hydrogel in less than about two hours.

12. A process for preparing an all-embracing hydrogel consisting essentially of a major proportion of aluminum oxide and a minor proportion of chromium oxide and in which the content of said oxides is between about 10 and about 30 percent by weight, which comprises mixing in concentration sufficient to insure said metal oxide content an aqueous solution of sodium aluminate having a sodium to aluminum ratio designated as R of not less than about 1 and not more than about 1.5 and an aqueous solution of chromic acetate having an acetate to chromium ratio of not less than about 4R–2.8 and not more than about 4R–2.4 to yield a hydrosol having a pH within the approximate range of 9 to 13 and characterized by an inherent capacity to set to a hydrogel in less than about 60 seconds.

13. A process for the production of spheroidal gel particles consisting essentially of a major proportion of aluminum oxide and a minor proportion of chromium oxide, which comprises mixing an aqueous solution of sodium aluminate having a sodium to aluminum ratio designated as R of not less than about 1 and not more than about 1.5 and an aqueous solution of chromic acetate having an acetate to chromium ratio of not less than about 2.8R–1.8 and not more than about 4R–2.4 to yield a hydrosol having a chromia-alumina content of between about 10 and about 30 percent by weight, a pH of between about 9 and about 13 and an inherent capacity to set to a hydrogel upon lapse of a suitable period of time, admitting said sol in the form of separate globules to a body of a fluid medium substantially immiscible with water wherein the globules assume a spheroidal shape and set to hydrogel, washing the resulting spheroidal hydrogel, drying and calcining the same to yield hard particles of chromia-alumina gel.

14. A process for the production of spheroidal gel particles consisting essentially of a major proportion of aluminum oxide and a minor proportion of chromium oxide, which comprises mixing an aqueous solution of sodium aluminate having a sodium to aluminum ratio designated as R of not less than about 1 and not more than about 1.5 and an aqueous solution of chromic acetate having an acetate to chromium ratio of not less than about 4R–2.8 and not more than about 4R–2.4 to yield a hydrosol having a chromia-alumina content of between about 10 and about 30 percent by weight, a pH between about 9 and about 13 and an inherent capacity to set a hydrogel in less than about 60 seconds, admitting said sol in the form of separate globules to a body of a fluid medium substantially immiscible with water wherein the globules assume a spheroidal shape and set to hydrogel, washing the resulting spheroidal hydrogel, drying and calcining the same to yield hard particles of chromia-alumina gel.

References Cited in the file of this patent

UNITED STATES PATENTS

| Number | Name | Date |
|---|---|---|
| 2,288,320 | Morey | June 30, 1942 |
| 2,323,868 | Hughes | July 6, 1943 |
| 2,363,498 | Burk et al. | Nov. 28, 1944 |
| 2,419,272 | Marisic et al. | Apr. 22, 1947 |
| 2,442,884 | Webb et al. | June 8, 1948 |
| 2,451,471 | Burk | Oct. 19, 1948 |
| 2,492,167 | Marisic et al. | Dec. 27, 1949 |
| 2,503,168 | Patrick | Apr. 4, 1950 |